United States Patent
Spanò et al.

(10) Patent No.: US 10,240,797 B2
(45) Date of Patent: Mar. 26, 2019

(54) METHOD OF OPERATING A COOKING APPLIANCE, CONTROL UNIT AND COOKING APPLIANCE

(71) Applicant: Electrolux Appliances Aktiebolag, Stockholm (SE)

(72) Inventors: Fabio Spanò, Forli (IT); Nicola Guardigli, Forli (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 0 days.

(21) Appl. No.: 14/768,572

(22) PCT Filed: Feb. 5, 2014

(86) PCT No.: PCT/EP2014/052235
§ 371 (c)(1),
(2) Date: Aug. 18, 2015

(87) PCT Pub. No.: WO2014/135327
PCT Pub. Date: Sep. 12, 2014

(65) Prior Publication Data
US 2016/0003484 A1    Jan. 7, 2016

(30) Foreign Application Priority Data
Mar. 8, 2013 (EP) ..................... 13158300

(51) Int. Cl.
*A23L 5/10* (2016.01)
*F24C 3/12* (2006.01)
(Continued)

(52) U.S. Cl.
CPC ................ *F24C 3/126* (2013.01); *A23L 5/10* (2016.08); *F24C 3/124* (2013.01); *F24C 5/16* (2013.01);
(Continued)

(58) Field of Classification Search
CPC ..... A23L 5/10; F24C 3/12–3/128; F24C 5/16; F24C 7/08–7/088;
(Continued)

(56) References Cited

U.S. PATENT DOCUMENTS 5,813,320 A * 9/1998 Frasnetti ................. F24C 3/126
126/39 G
5,975,072 A * 11/1999 Garceau ................. A47J 37/06
126/39 G
(Continued)

FOREIGN PATENT DOCUMENTS

CN        1470805        1/2004
CN    100470138 C        3/2009
(Continued)

OTHER PUBLICATIONS

International Search Report issued in Application No. PCT/EP2014/052235 dated May 26, 2014.

*Primary Examiner* — Drew E Becker
(74) *Attorney, Agent, or Firm* — Pearne & Gordon LLP

(57) ABSTRACT

A method of operating a cooking zone (2) of a cooking appliance (1). The method includes determining an actual temperature value representative of an actual temperature of an item (6) to be heated; determining a power level (I) set on a user control device (3); and calculating a rectified power level (II) based on the actual temperature value, the actual power level (I) and a preset setpoint temperature. The rectified power level (II) is configured to remove differences between the actual temperature value and setpoint temperature and the rectified power level (II) is indicated on a user display (9, 4).

17 Claims, 2 Drawing Sheets

(51) Int. Cl.
*H05B 1/02* (2006.01)
*F24C 5/16* (2006.01)
*F24C 7/08* (2006.01)

(52) U.S. Cl.
CPC .............. *F24C 7/083* (2013.01); *F24C 7/085* (2013.01); *F24C 7/087* (2013.01); *F24C 7/088* (2013.01); *H05B 1/0261* (2013.01); *G01K 2207/06* (2013.01)

(58) Field of Classification Search
CPC ............ G01K 2207/02–2207/08; H05B 1/0261–1/0266; H05B 6/645–6/6455; H05B 6/687
USPC ........... 426/231–233, 523; 99/328, 333, 338, 99/342–344; 345/184
See application file for complete search history.

(56) References Cited

U.S. PATENT DOCUMENTS

| | | | | |
|---|---|---|---|---|
| 6,837,148 | B1* | 1/2005 | Deschenes | A47J 27/00 99/325 |
| 7,141,258 | B2* | 11/2006 | Hillmann | F24C 7/082 219/393 |
| 8,136,442 | B2* | 3/2012 | Strutin-Belinoff | F24C 7/082 219/506 |
| 8,730,038 | B2* | 5/2014 | Durian | F24C 7/082 126/21 A |
| 2004/0070574 | A1* | 4/2004 | Wylie | F24C 7/082 345/184 |
| 2005/0211104 | A1* | 9/2005 | Harris, Jr. | G01K 1/02 99/342 |
| 2007/0117058 | A1* | 5/2007 | Furuti | F24C 3/126 431/281 |
| 2007/0145034 | A1 | 6/2007 | Imura | |
| 2009/0183729 | A1* | 7/2009 | Barkhouse | A47J 27/62 126/39 BA |
| 2010/0132692 | A1* | 6/2010 | Shaffer | A47J 37/0713 126/39 E |
| 2010/0213187 | A1* | 8/2010 | Bandholz | H05B 6/6441 219/506 |
| 2010/0303972 | A1* | 12/2010 | Srivastava | A23L 5/10 426/233 |
| 2011/0137657 | A1* | 6/2011 | Cenedese | A47L 15/4293 704/275 |
| 2013/0092032 | A1* | 4/2013 | Cafferty | F24C 7/08 99/325 |
| 2013/0249847 | A1* | 9/2013 | Goss | F24C 7/082 345/173 |
| 2014/0039650 | A1* | 2/2014 | Baraille | A47J 37/00 700/90 |
| 2014/0170275 | A1* | 6/2014 | Bordin | G09B 19/24 426/233 |
| 2015/0163865 | A1* | 6/2015 | Lee | H05B 6/687 426/231 |
| 2015/0192302 | A1* | 7/2015 | Ortner | F24C 7/085 99/332 |

FOREIGN PATENT DOCUMENTS

| | | |
|---|---|---|
| CN | 102066841 | 5/2011 |
| DE | 10 2006 039 235 A1 | 2/2008 |
| EP | 0 089 247 A1 | 9/1983 |
| EP | 0 190 004 A2 | 8/1986 |
| EP | 0 429 120 A2 | 5/1991 |
| EP | 0 514 212 A1 | 11/1992 |
| EP | 0 694 260 A1 | 1/1996 |
| FR | 2 945 608 A1 | 11/2010 |
| GB | 2 073 455 A | 10/1981 |
| GB | 2170326 | 7/1986 |
| JP | H11-108372 A | 4/1999 |

* cited by examiner

METHOD OF OPERATING A COOKING APPLIANCE, CONTROL UNIT AND COOKING APPLIANCE

BACKGROUND OF THE INVENTION

The present application is directed to a method of operating a cooking appliance, in particular a gas cooking appliance, to a control unit and to a cooking appliance.

Cooking appliances are known in many configurations and variants. In most cases, control elements for cooking zones of the cooking appliance are implemented as taps or actuators configured for setting the power or, in case of gas hobs, the gas level for the gas hob.

Setting adequate power levels in some cases requires considerable experience, in particular with respect to avoiding burnt or over-heated food and the like. In this respect, it would be desirable to make it easier for a user to set adequate and reasonable power levels, in particular gas flow rates in case of gas hobs.

Therefore, it is an object of the invention to provide a method of operating a cooking appliance, in particular a gas hob of a gas cooking appliance such as a gas stove, a respective control device and a cooking appliance, respectively, facilitating operation and handling, in particular facilitating setting adequate and reasonable power levels, in particular gas flow rates or gas levels.

BRIEF SUMMARY OF THE INVENTION

A method of operating a cooking zone of a cooking appliance, in particular a gas cooking appliance, in particular a gas hob of a gas stove, is provided, comprising:
  determining an actual temperature value representative of an actual temperature of an item, such as for example food, water, oil and the like, to be heated;
  determining a power level set on a user control device, such as for example a tap, actuator, button, knob or slider, or touch-sensitive element;
  calculating a rectified, in particular corrected or adjusted, power level based on the actual temperature value, the power level and a preset setpoint temperature, wherein the rectified power level is configured to remove differences between the actual temperature value and setpoint temperature; and
  optionally indicating the rectified power level on a user interface, in particular a display device; and
  further optionally setting the power level in correspondence or according to the calculated rectified power level.

In calculating the rectified power level, and optionally showing the same on a user interface, and further optionally setting the power level to the calculated rectified power level, the user can be assisted in selecting adequate power levels, in particular during ongoing operation of the gas hob.

As mentioned above, the item to be heated can be a food item, water or oil and the like used for and in connection with cooking.

The item to be heated can also be cookware placed on the gas hob, wherein the temperature of the cookware may be used to indirectly calculate the temperature of food, water, oil and other items placed in the cookware. The cookware may be a pan or pot.

The power level of a gas hob of a gas stove for example may be represented by a flame level of a gas burner of the gas hob. Similar indicators for the power levels of other types of cooking zones may be used.

According to the proposed method, the power level is a parameter that can be set on a user control device. The user control device may be a button, knob or slider type control element, in particular a rotary type control element as commonly used in particular with gas hobs or other types of controls and actuators.

Calculating the rectified power level is proposed to be carried out by using at least the actual temperature of the item of interest, the actual power level and a setpoint temperature. The actual temperature may for example be measured by temperature probes or sensors, and the actual power level may for example be provided by the user control device or a respective controller, or determined by using suitable encoders.

The setpoint temperature shall be understood to represent a temperature to which the item of interest shall be heated and/or a temperature at which the item of interest shall be held during a cooking process, and/or a temperature the item of interest shall be adhered to during cooking. The setpoint temperature therefore may be a target temperature for the item to be heated.

Calculating the rectified power level may comprise raising the actual power level, in particular by a predefined amount, if the actual temperature is below the setpoint temperature. The setpoint temperature may be understood to comprise a single temperature value, but also may be understood to comprise a temperature range or band with an upper and lower limit and preferably a centered average temperature. In case of a temperature band, the actual power level is raised in case that the actual temperature falls below the lower limit. In case that the actual temperature is above the setpoint temperature, calculating the rectified power level comprises lowering the actual power level, for example m by a preset amount. In cases in which there is no difference between the actual temperature and setpoint temperature the rectified power level equals the actual power level. In case of a temperature band, the term "no difference" shall mean, that the actual temperature lies within the temperature band, i.e. neither lies above the upper limit nor lies below the lower power limit.

As can be seen, the rectified power level is calculated in such a way that differences between the actual temperature and the setpoint temperature are decreased or even removed. The option of indicating the rectified power level to the user helps him to adjust the power level and therefore heat applied to the items to be heated or cooked. In this way too high temperatures, leading to burnt or overheated food, but also too low temperatures, leading to a slower or not enough heated cooking process, may be avoided.

In an embodiment of the method, determining the actual temperature comprises at least one of
  directly measuring the temperature of the item to be heated via a temperature probe, and
  measuring at least one of a secondary temperature of cookware containing the item to be heated and a secondary temperature of the cooking zone, in particular cooking surface of the cooking zone, and calculating the actual temperature from the at least one measured secondary temperature.

Using a temperature probe may be advantageous for food items such as a piece of meat or others. The alternative of indirect temperature measurement may be used when temperature probe in contact with food is not appreciated and/or easy to do.

In an embodiment of the method, determining the actual power level comprises detecting an operating position, in particular rotational position of a power control device, in particular a tap, knob, slider, button, actuator, or any other type of control element, respectively configured to control the power level, in case of gas hobs the gas supply. This in particular may be used if the actual operating position is not already available, for example in an electronic memory of a control unit. This situation may be the case with most types of gas hobs controlled via rotary type control knobs.

In a further embodiment, calculating the rectified power level comprises calculating a rectified operational position, in particular rectified rotational position of a power control device, in particular tap and the like, which is configured to control the power level of, i.e. energy supply, in particular gas supply to, the cooking appliance, in particular a respective cooking zone. Similar to the description above, the rectified power level is configured to remove differences between the actual temperature value and setpoint temperature. In more details, if the actual temperature is below the setpoint temperature, the rectified power level will be or is calculated to be higher than the actual power level, and if the actual temperature is above the setpoint temperature, the rectified power level will be or is calculated to be lower than the actual power level. Using the operational position may be helpful to a user in setting an adequate power level.

In a yet further embodiment of the method, it is provided that indicating the rectified power level comprises showing the rectified power level on a user interface, in particular display, implemented in, on or at the control device, in particular tap, knob and the like. The control device in case of gas hobs may be a tap configured to control gas supply to the gas hob. In showing or displaying the rectified power level/s, improved user guidance can be obtained, in particular if the cooking appliance comprises several control devices, such as taps and the like. The user interface in, on or at the control device, which may in particular be any of a button, knob, slider and so on, in particular may be designed according to the outline and/or moving direction or modality of the control device. In particular with circular rotatable type control devices, such as taps or knobs, the user interface may be of circular design. Other variants and designs may use bar- or bar-graph-shaped user interfaces. Adjusting or adapting the user interface, in particular in shape and form, to the type and design of the tap can improve visibility and user guidance in setting the rectified power level.

In a variant, it may be provided, that indicating the rectified power level comprises showing the rectified operational position on a user interface implemented in, on or at the control device. The difference to the above embodiment is that the operational position corresponding to the rectified power level is showed or indicated. This may simplify the setting of the rectified power level which of course corresponds to the rectified operational position.

In a further variant, it is provided that indicating the rectified power level comprises showing on the user interface a direction of operation required for transferring the gas tap to a position corresponding to the rectified power level. Clearly, this may simplify setting the correct and adequate power level.

In a further embodiment of the method it is provided that indicating the rectified power level comprises outputting an acoustical signal. Providing an acoustical signal is advantageous for catching the attention of the user. This is of particular advantage as the user of a cooking appliance in general is not constantly monitoring respective display elements or units.

In an embodiment of the method it is provided that indicating the rectified power level comprises highlighting an actual control device position indicator according to a predefined modality. The highlighting modality preferably is configured to represent or to be indicative of a direction of actuation required for moving or transferring the control device, which in any embodiments may be a control device to be manually operated by the user, to the adequate rectified power level or rectified operational position.

As an example, highlighting the control device position indicator in a first color, e.g. green color, may suggest reducing the power level, for example by a counter clockwise rotation of the tap or knob. Highlighting the tap position indicator in a second color, e.g. blue color, may suggest increasing the power level, for example by a clockwise rotation of the tap or knob. If no action is required, the tap position indicator may be highlighted in a third color, e.g. red. If the tap or knob is actuated as suggested, the control device position indicator may be highlighted in a fourth color or simply non-highlighted. Setting or reaching the suggested rectified power level may be confirmed by an acoustical signal, in particular a beep sound and the like.

In an embodiment of the method it is proposed that the rectified power level, in particular rectified operational position, is automatically set by a controller of the cooking appliance, in particular cooking zone. Such a possibility can clearly disburden the user or operator of the cooking appliance.

In a variant, the controller is configured to issue a user validation request, preferably on the user interface, and is further configured to set the rectified power level, in particular rectified operational position, only upon receiving a positive user validation signal. A user validation request shall be understood as a type of interrogation or query directed to the user. Implementing a user validation request may be advantageous for avoiding absurd or inadequate automated settings for the rectified power level or rectified operational position.

As can be seen from the above, the proposed method and its embodiments and variants are suitable for easing operation and handling of a cooking appliance.

A control unit or device is provided. The control unit is configured to control the operation of a cooking zone, of a cooking appliance. Further, the control device comprises a controller configured for executing the method as proposed above, in particular according to any embodiment and variant. As to advantages and advantageous effects, reference is made to the description above.

A cooking appliance, in particular gas cooking appliance, is proposed. The cooking appliance, as well as the appliances to which the method and control unit may be applied to, may be of domestic type. The cooking appliance comprises at least one cooking zone, such as for example a gas burner, a user control device or interface, e.g. a gas tap, a control unit and a user visual interface, such as a display and the like. A controller of the control unit is connected to at least the user control device and visual user interface and configured such that it can execute a method as proposed above, in particular according to any embodiment and variant.

In an embodiment of the cooking appliance, at least one temperature probe or sensor is provided which is configured for at least one of measuring an actual temperature of an item to be heated within a cookware and/or on cooking surface placed on the cooking zone of the cooking hob, and configured for measuring a temperature of the cookware and/or on cooking surface or of the item placed on the cooking zone. Here, direct and/or indirect measurements or calculations of the temperature of the item or substance to be heated can be implemented. Reference is made to the description above, in particular related to temperature measurements.

Further, it is proposed that the controller is connected to the at least one temperature probe or sensor for receiving actual temperature values used for calculating the rectified power level. This means, that the controller may receive and use the measured temperature values for calculating the rectified power level.

In an embodiment of the cooking appliance, an encoder is provided which is configured for measuring or determining a power level, in particular a control position or turning position, of the control device. The controller may be connected to the encoder for receiving actual power levels of the gas tap. The actual power levels may be used by the controller for calculating the rectified power level.

In all it becomes clear that the proposed method, control device and cooking appliance are suitable for facilitating operation and handling of cooking processes.

BRIEF DESCRIPTION OF THE DRAWING

Embodiments of the invention will now be described in connection with the annexed figures, in which.

DETAILED DESCRIPTION

The invention will now be described in connection with selected embodiments of a cooking appliance, wherein the selected embodiments shall not be construed as limiting the scope of the invention.

Figure 1:
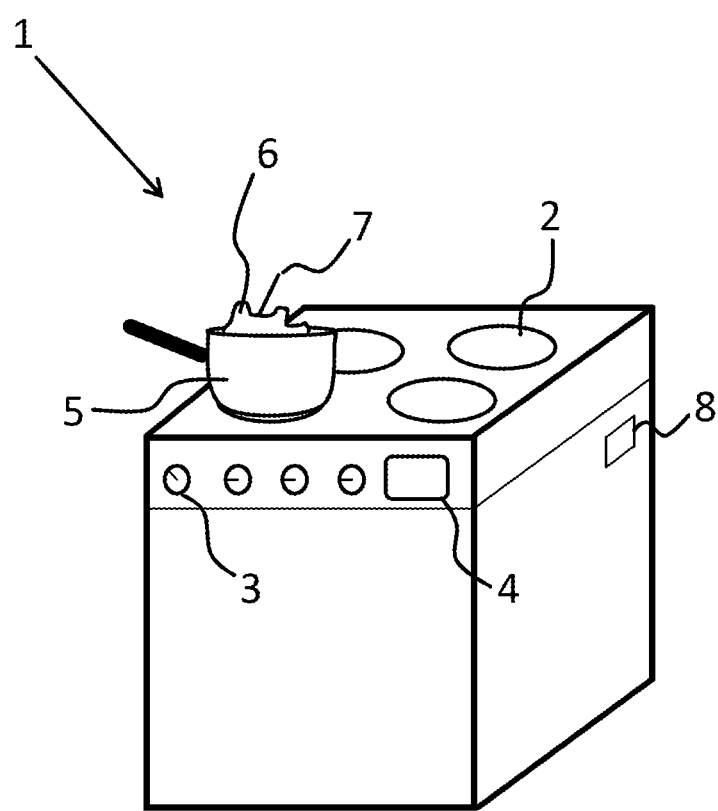
FIG. 1 shows a schematic representation of a cooking appliance.

FIG. 1 shows a schematic representation of a cooking appliance 1. The cooking appliance 1 in the present case comprises four cooking zones 2. The cooking appliance 1 further comprises a power control device 3 for each of the four cooking zones 2. In the present case, the control devices 3 are rotatable knobs adapted to set respective power levels of the cooking zone. A rotation in one direction, e.g. in counter-clockwise or in clockwise direction, will raise the power level, and therefore cooking zone power or power level, and rotation in the other, i.e. opposite, direction, e.g. in clockwise or in counter-clockwise direction will decrease the power level, and therefore the cooking zone power or power level.

The cooking appliance 1 further comprises a user interface element, in particular a user display 4, which may be implemented as a touch-sensitive user control interface.

As can be seen from FIG. 1, a pan 5 or pot is placed on one of the cooking zones 2. The pot 5 is placed on cooking zone 2 for the purpose of heating, in particular roasting, broiling or cooking a food item 6, such as for example a piece of meat. In FIG. 1, a temperature probe 7 is inserted into the food item 6, in particular to measure the core temperature of the food item 6.

For ordinary operation, the user can select via the control device 3 a power level intended to be suitable for cooking the food item 6. With the present example, a setpoint temperature, i.e. a temperature set by the user via the user interface 4 or fixed in a cooking program selectable by the user via the interface 4, is defined. The setpoint temperature is the temperature level at which the core temperature of the food item shall be kept throughout the whole cooking cycle.

Usually, the index on the power control device is representative of the power level of the cooking zone and is not that correlated to the core temperature of the food item 6. Therefore, it may in many cases be difficult for a user to set a suitable and adequate power level, albeit he knows the setpoint core temperature.

In order to remove the problem of adequately setting the optimal or best possible power level for heating or cooking the food item 6, the cooking appliance 1 comprises a control unit with a controller 8, which is configured to execute a method of calculating a rectified power level for the cooking zone 2.

The controller 8 in particular is adapted to calculate a rectified power level based on an actual temperature value of the food item 6, the power level of the cooking zone 2, and a preset setpoint temperature.

The actual temperature in the present case is measured by the temperature probe 7 and transmitted and/or communicated to the controller 8, in particular via radio transmission and/or by wire. The actual power level of the cooking zone 2 is determined by an encoder adapted to measure the rotary position of the control device 3. The rotary position in the present case corresponds to a power level of a cooking zone 2 of the cooking appliance 1.

The rectified power level is configured to remove differences between the actual temperature value and setpoint temperature, which means that over-temperature or under-temperature of the food item 6 can be counteracted in that the rectified power level is lower or higher than respective actual power levels.

The controller 8 is further adapted to indicate the calculated power level on a user visual interface 4. The indication may for example be shown in the user visual interface 4. But it is also possible, that a user visual interface implemented or integrated at or on the control device 3 is used for indicating, or at least suggesting, the rectified power level.

Figure 2:
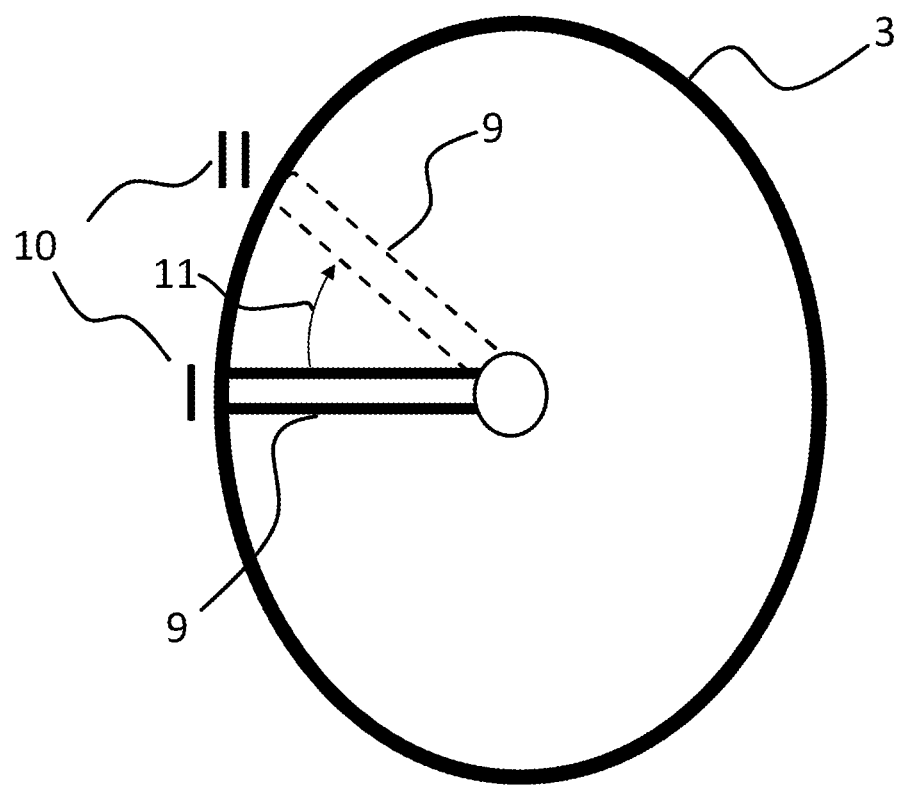
FIG. 2 shows details of a gas knob and integrated display.

The user visual interface integrated at or on the control device 3, i.e. a rotary knob, may for example comprise one or more radial user visual interface bars 9. The user visual interface bars 9 may be arranged such that in any rotary position of the control device 3 a user visual interface bar 9 is aligned with a power level 10. In FIG. 2, for the sake of simplicity, only two power levels, I and II, are indicated.

The user visual interface bar 9 in solid lines, directed to the power level "I" corresponds to the current setting of the control device 3. In the present exemplary situation, the temperature probe or sensor has measured an actual core temperature of the food item 6, which core temperature is lower than the setpoint core temperature. Therefore, the controller 8 has calculated or calculates a rectified power level which in the present case corresponds to power level "II".

The rectified power level "II" of the present embodiment is indicated by the dotted user visual interface bar 9 aligned to the power level "II". The user visual interface bar 9 aligned to the rectified power level "II" is highlighted, in particular illuminated, in order to indicate to the user that power level "II" would be appropriate. If the user then moves the control device 3 to power level "II", the user visual interface bar 9 aligned with power level "II" will then be indicated as the actual power level.

The whole process is continuously repeated during the entire cooking process of the food item 6. Therefore, optimal and adequate power settings can be provided over the whole cooking process. It shall be noted that the rectified power level can be set automatically, either by moving, i.e. rotating, the control device 3 by a suitable actuator, or by, either directly or indirectly, operating a respective energy controller without moving the control device 3, but indicating the actual power level by a respective user visual interface bar 9 or other display.

Highlighting respective user visual interface bars 9 in particular corresponds to showing rectified operational positions or rectified power levels.

If required, the additional information as to which direction the user has to move the control device 3 in order to arrive at the rectified power level can be indicated. Instead of using an arrow or other symbols as shown in FIG. 2, the direction of movement may be color coded, which means that raising, lowering or keeping the power level may be assigned to or represented by different colors of respective user visual interface bars 9, for example. In the example of FIG. 2, a direction of movement 11 for the control device 3 in order to obtain the rectified power level is indicated by an arrow.

In addition to the visual indications of the rectified power level as set out above and further above, it is possible that an acoustic signal is outputted, in particular by the controller 8. The acoustic signal may inform the user that adjustment of the power level is available and required for optimal cooking.

Showing, in particular indicating, the rectified power level may be implemented in any other way. In particular, instead of or additionally to the use of user visual interface bars 9, it is possible to indicate power levels and/or actual and/or setpoint temperature values in a bar view, bargraph view and/or numeric displays on or at the control device 3 and/or on or at the user visual interface 4.

As can be seen, the present invention is suitable for facilitating operation and handling of a cooking appliance. The invention in particular is suitable for facilitating setting adequate and reasonable power levels.

LIST OF REFERENCE NUMERALS

1 cooking appliance
2 cooking zone
3 control device
4 user visual interface
5 pan and/or cooking surface
6 food item
7 temperature probe
8 controller
9 user visual interface bar
10 power level
11 direction of movement
I actual power level
II rectified power level

What is claimed is:

1. Method of operating a cooking zone of a cooking appliance, comprising:
    determining an actual temperature value representative of an actual temperature of an item to be heated;
    determining an actual power level set on a power control device configured to control the power level of the cooking zone;
    calculating a rectified power level based on the actual temperature value, the actual power level and a preset setpoint temperature of the item to be heated, wherein the rectified power level is configured to remove differences between the actual temperature value and setpoint temperature of the item to be heated;
    indicating the rectified power level on a user interface by showing a movement required for transferring the control device to an operational position corresponding to the rectified power level; and
    a controller of the cooking appliance requesting user validation to set the rectified power level and the controller automatically setting the power level of the cooking zone to the rectified power level only upon receiving a positive user validation signal.

2. Method according to claim 1, wherein determining the actual temperature value comprises at least one of
    directly measuring the temperature of the item (6) to be heated via a temperature probe (7), and
    measuring at least one of a secondary temperature of cookware (5) containing the item (6) to be heated and a secondary temperature of the cooking zone (2), and calculating the actual temperature value from the at least one measured secondary temperature.

3. Method according to claim 1, wherein determining the actual power level (I) comprises detecting an operating position of the power control device (3) configured to control the power level of the cooking zone (2).

4. Method according to claim 1, wherein calculating the rectified power level (II) comprises calculating a rectified operational position of the power control device (3) configured to control the power level of the cooking zone (2).

5. Method according to claim 1, wherein indicating the rectified power level (II) comprises showing the rectified power level (II) on a user interface (9) implemented at the control device (3) configured to control the power level of the cooking zone (2).

6. Method according to claim 5 wherein indicating the rectified power level (II) comprises showing a rectified operational position (II) of the control device (3) on a user interface (9) implemented at the control device (3) configured to control the power level to the cooking zone (2).

7. Method according to claim 5, wherein indicating the rectified power level (II) comprises showing a direction of operation (11) required for transferring the control device (3) to a position corresponding to the rectified power level (II).

8. Method according to claim 1, wherein indicating the rectified power level (II) comprises outputting an acoustical signal.

9. Method according to claim 1, wherein indicating the rectified power level comprises highlighting an actual control device position indicator, wherein the highlighting is configured to represent a direction of actuation required for transferring the control device to the rectified power level or rectified operational position.

10. Method according to claim 1, further comprising indicating the rectified power level (II) on a user interface (9).

11. Method according to claim 1, wherein determining the actual power level (I) comprises detecting a rotational position of a power control device (3) configured to control the power level of the cooking zone (2).

12. Method according to claim 1, wherein calculating the rectified power level (II) comprises calculating a rectified rotational position of a power control device (3) configured to control the power level of the cooking zone (2).

13. Method according to claim 9, wherein the control device is highlighted by a first color when power level is to be reduced, the control device is highlighted by a second color when the power level is to be increased, and the control device is highlighted by a third color when the power level is to be kept the same.

14. Method according to claim 1, wherein an arrow indicates a direction of movement for the control device in order to obtain the rectified power level.

15. Method according to claim 1, wherein the rectified power level is indicated on a display by a visual illumination aligned to the rectified power level.

16. Method according to claim 1, wherein the user interface is on or at a rotatable type control device and showing a direction of operation includes displaying a direction of rotation.

17. Method according to claim 1, wherein the rectified power level is indicated by a user visual interface bar aligned to a rectified power level.

* * * * *